United States Patent [19]
Lamb et al.

[11] Patent Number: 5,409,291
[45] Date of Patent: Apr. 25, 1995

[54] COMBINED CHAIR AND BACKPACK

[76] Inventors: Timothy A. Lamb, 11254 Collings Rd.; Albert Mora, 20 Violet La., both of Ione, Calif. 95640

[21] Appl. No.: 103,275

[22] Filed: Aug. 6, 1993

[51] Int. Cl.6 .................... A47C 13/00; A45F 4/02
[52] U.S. Cl. .................. 297/129; 297/188.06; 297/188.12; 297/188.14; 224/155; 224/212
[58] Field of Search ............... 297/39, 129, 188, 191, 297/194; 224/153, 155, 156, 159, 212

[56] References Cited

U.S. PATENT DOCUMENTS

| | | | |
|---|---|---|---|
| 2,909,215 | 10/1959 | Mitchell | 297/188 |
| 3,077,327 | 2/1963 | Batie eet al. | 297/188 |
| 3,902,640 | 9/1975 | Geiben | 224/153 |
| 4,286,739 | 9/1981 | Silcott et al. | 224/156 |
| 4,300,707 | 11/1981 | Kjaer | . |
| 4,392,598 | 7/1983 | Dixon | . |
| 4,487,345 | 12/1984 | Pierce | . |
| 4,577,901 | 3/1986 | Phillips | . |
| 4,676,548 | 6/1987 | Bradbury | 224/155 |
| 4,773,574 | 9/1988 | Burgard | 224/155 |
| 5,318,342 | 6/1994 | Hale | 297/129 |

FOREIGN PATENT DOCUMENTS

| | | | |
|---|---|---|---|
| 2038986 | 9/1992 | Canada | 224/155 |
| 1037476 | 9/1953 | France | 297/188 |
| 1469054 | 3/1977 | United Kingdom | 297/129 |

Primary Examiner—Richard A. Bertsch
Assistant Examiner—Roland G. McAndrews, Jr.
Attorney, Agent, or Firm—Jerry T. Kearns

[57] ABSTRACT

A combined chair and backpack includes a conventional folding lawn chair type frame having an upper transverse frame member pivotally connected to an upper portion of a pack frame. In an open orientation of the chair, the pack frame and chair back frame form an A-frame configuration to enhance stability. A removable reversible head rest/top pack assembly includes tubular side frame members which telescopically receive upper mounting rod portions of the pack frame. In an open condition, the head rest faces the chair, and in a closed condition the head rest is reversed such that the top pack is disposed in overlying relation with respect to the collapsed chair. A plurality of straps suspend a pair of insulated beverage and food storage bags from respective opposite arm rests. Internal stiffeners maintain the bags erect. In a closed configuration, quick release straps secure edge portions of the bags in adjacent relation. An umbrella is mounted on an upper portion of the pack frame for independent compound pivotal adjustment about two perpendicular axes and useable in both closed transportation and open operative configurations of the chair. The combined chair and backpack includes a variety of attached comfort enhancing and sporting related features such as an insulated beverage holder, fishing creel, and fishing rod holder, all readily and immediately useable upon folding of the chair to an open configuration.

20 Claims, 5 Drawing Sheets

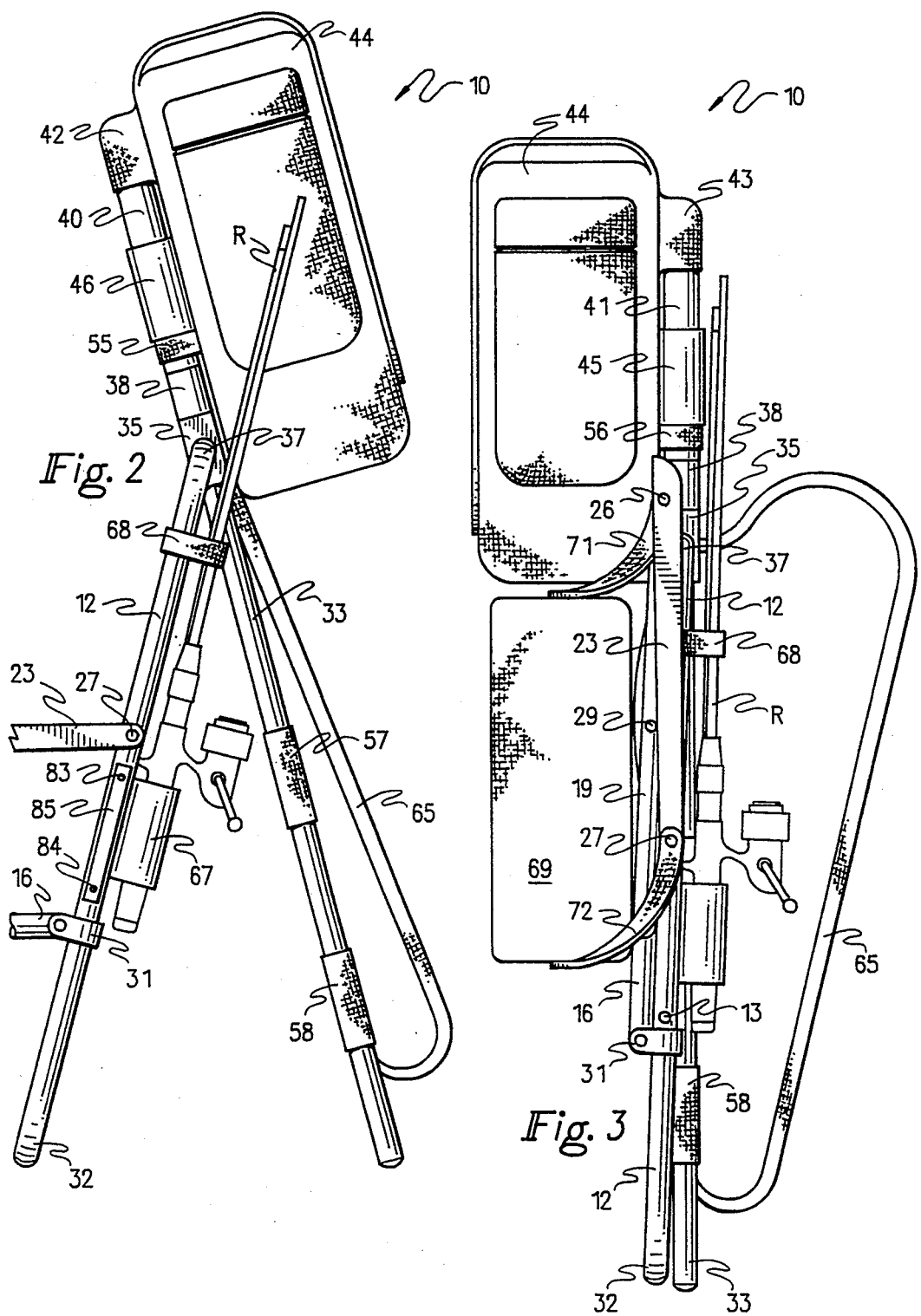

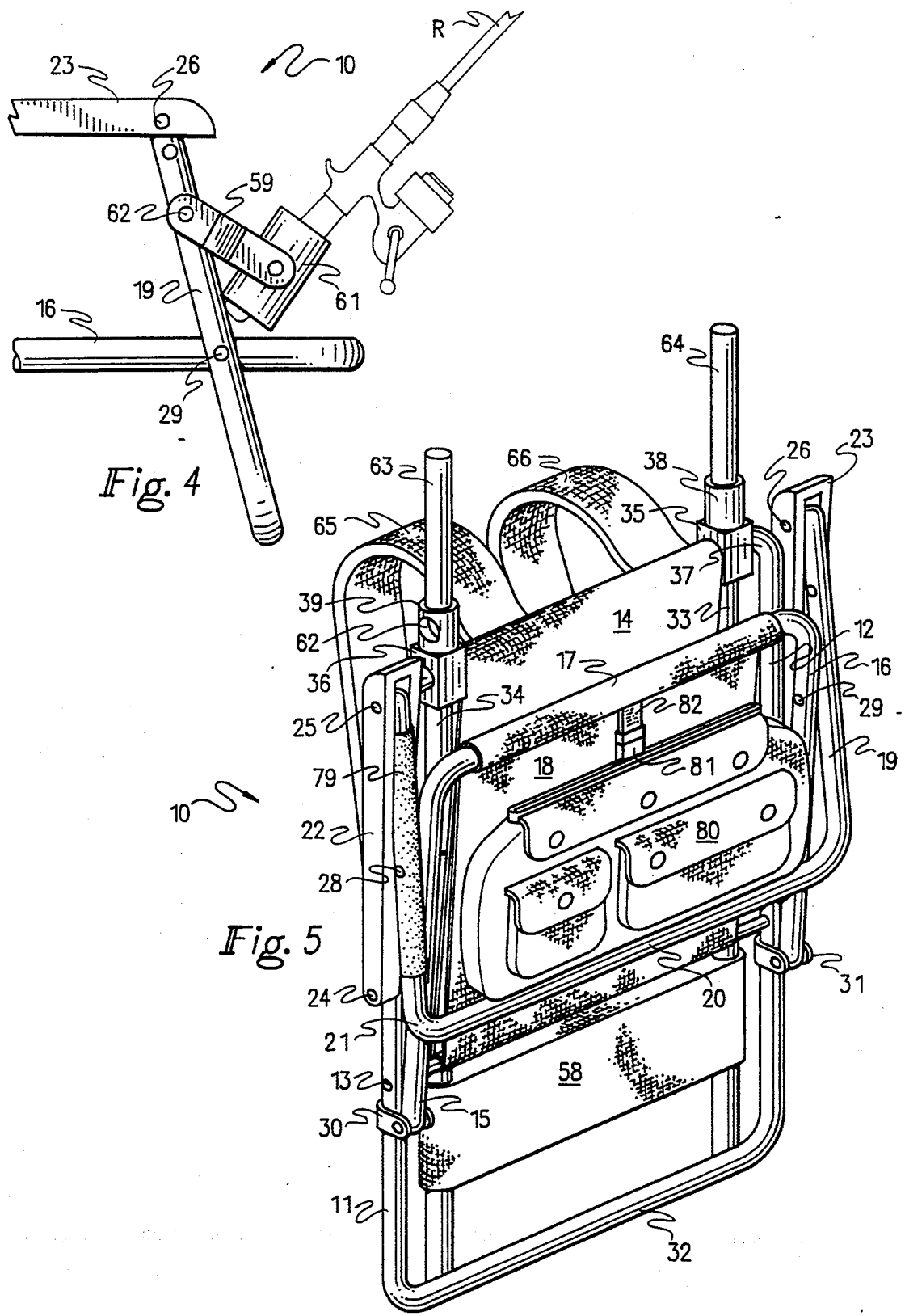

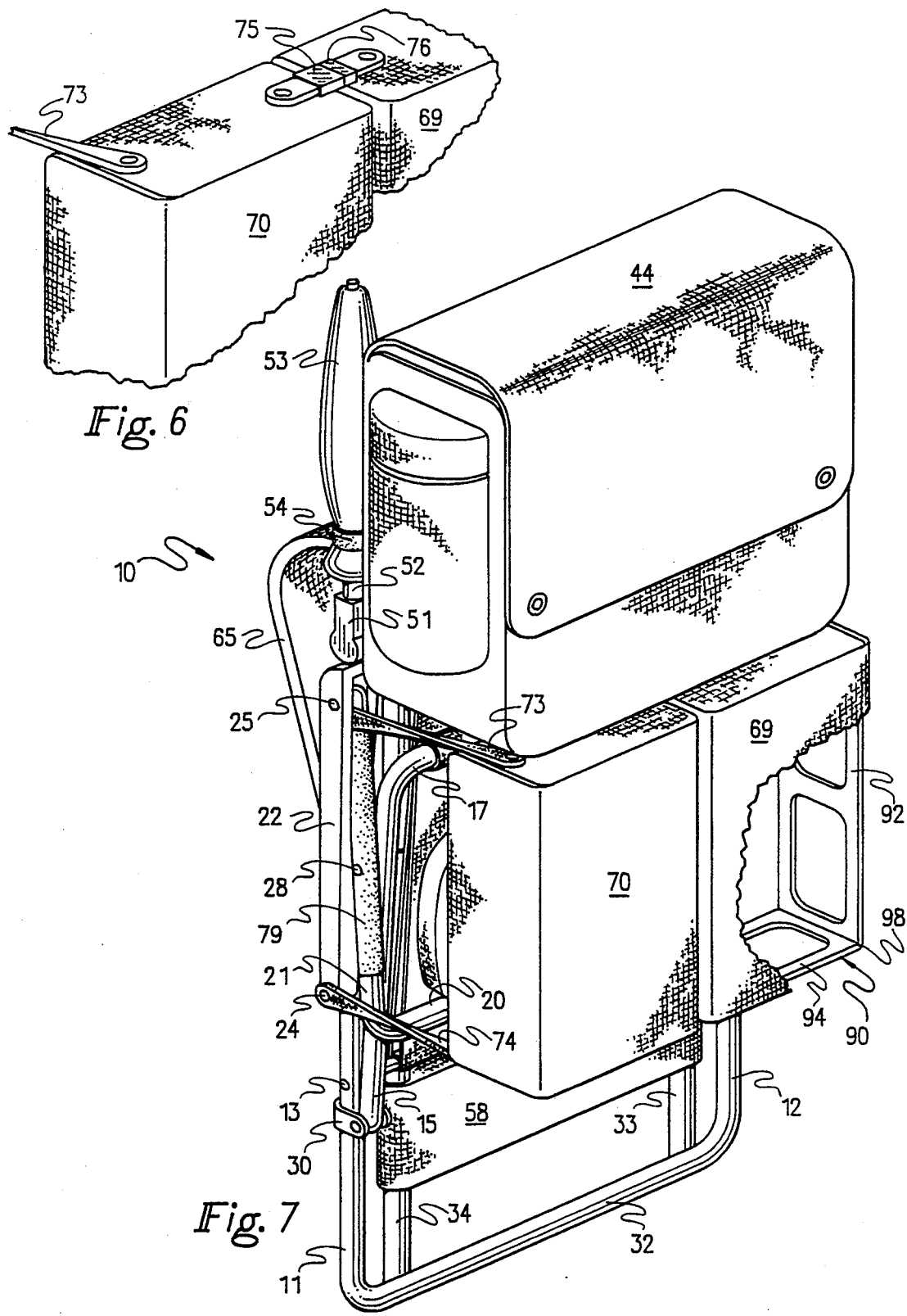

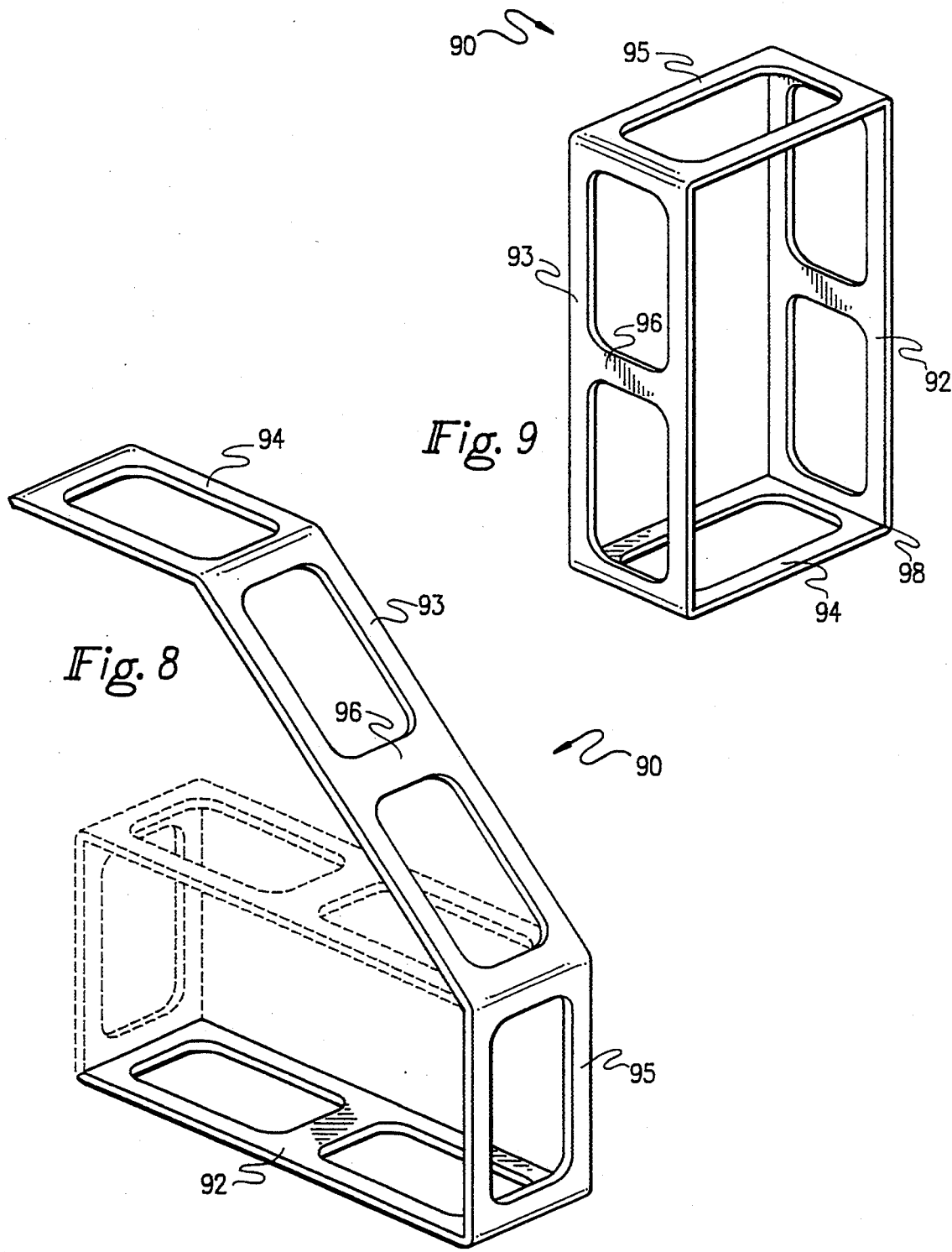

COMBINED CHAIR AND BACKPACK

BACKGROUND OF THE INVENTION

1. Field of the Invention

The present invention relates to combined chairs and backpacks, and more particularly pertains to an improved combined chair and backpack which enables users to conveniently transport a variety of different comfort enhancing items to remote locations, especially when participating in various outdoor sporting and recreational activities.

2. Description of the Prior Art

A variety of combined chairs and backpacks have been proposed by the prior art. U.S. Pat. No. 4,286,739 discloses a back pack frame convertible to a chair or cot which includes telescopic chair leg portions and an umbrella. U.S. Pat. No. 4,300,707 discloses a combined rucksack frame and chair including a pivotal chair seat frame portion connected to a backrest portion by a pair of bifurcated pivot brackets. U.S. Pat. No. 4,392,598 discloses a convertible backpack chair including rigid side panels defining pack bag volume. U.S. Pat. No. 4,487,345 discloses a backpack chair including a pivotal folding chair type frame foldable between open and closed configurations. U.S. Pat. No. 4,577,901 discloses a convertible backpack chair including pivotally connected frame members moveable between open and closed configurations. U.S. Pat. No. 4,676,548 discloses a combined backpack and chair including a folding chair type frame in which backpack shoulder straps are selectively securable around the chair legs in an open position to give added support. The entire disclosures of each of the above described patents are hereby incorporated herein by reference.

While it can thus be appreciated that the field of convertible combined chairs and backpacks is relatively crowded, none of the prior art device heretofore proposed provide particularly comfortable chairs, and also lack numerous comfort enhancing amenities.

SUMMARY OF THE INVENTION

Accordingly, it is an object of the present invention to provide a new and improved combined chair and backpack which includes a reversible head rest/top pack assembly to provide maximum storage and comfort.

It is a further object of the present invention to provide a new and improved combined chair and backpack which is of a durable and reliable construction.

An even further object of the present invention is to provide a new and improved combined chair and backpack including insulated storage bags for beverages and foods which are easily moveable between compact storage and readily accessible operative positions, without tedious disassembly.

Still another object of the present invention is to provide a new and improved combined chair and backpack including a variety of comfort enhancing and sporting related features such as an insulated beverage holder, umbrella, fishing creel, and fishing rod holder, all readily and immediately useable upon folding of the chair to an open configuration.

Yet another object of the present invention is to provide a new and improved combined chair and backpack including separate pivotally connected pack frame and chair back frame components selectively disposable in an V-frame configuration for providing enhanced support and stability.

Even still another object of the present invention is to provide a new and improved combined chair and backpack including an umbrella mounted for independent compound pivotal adjustment about two perpendicular axes and useable in both closed transportation and open operative configurations of the chair.

A further object of the present invention is to provide a new and improved combined chair and backpack which may be carried on an individual's back in both erect and collapsed orientations of the chair, such that additional items may be transported on the chair seat portion.

In order to achieve these and other objects of the invention, the present invention provides an improved combined chair and backpack which includes a conventional folding lawn chair type frame having an upper transverse frame member pivotally connected to an upper portion of a pack frame. In an open orientation of the chair, the pack frame and chair back frame form an inverted V-frame configuration to enhance stability. A removable reversible head rest/top pack assembly includes tubular side frame members which telescopically receive upper mounting rod portions of the pack frame. In an open condition, the head rest faces the chair, and in a closed condition the head rest is reversed such that the top back is disposed in overlying relation with respect to the collapsed chair. A plurality of straps suspend a pair of insulated beverage and food storage bags from respective opposite arm rests. Memory characteristics of deformed internal plastic stiffeners maintain the bags in an erect condition. In a closed configuration, quick release straps secure edge portions of the bags in adjacent relation. An umbrella is mounted on an upper portion of the pack frame for independent compound pivotal adjustment about two perpendicular axes and useable in both closed transportation and open operative configurations of the chair. The combined chair and backpack includes a variety of attached comfort enhancing and sporting related features such as an insulated beverage holder, fishing creel, and fishing rod holder, all readily and immediately useable upon folding of the chair to an open configuration.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 2 is a partial side elevational view thereof, with the chair in an open position;

FIG. 3 is a side elevational view thereof, with the chair folded to a closed position;

FIG. 4 is a side elevational detail view illustrating a fishing rod holder component thereof;

FIG. 5 is a perspective view thereof, with the chair folded to a closed position and the head rest/top pack assembly and insulated storage bags removed;

FIG. 6 is a perspective detail view illustrating a quick release fastener for securing storage bag components thereof in a closed condition for transportation;

FIG. 7 is a perspective view thereof, with the chair folded to a closed position for transportation;

FIG. 8 is a perspective view illustrating the manner of making a storage bag stiffening insert for maintaining the storage bags in an erect condition; and FIG. 9 is a perspective view further illustrating the storage bag stiffening insert.

DETAILED DESCRIPTION OF THE PREFERRED EMBODIMENT(S)

Figure 1:
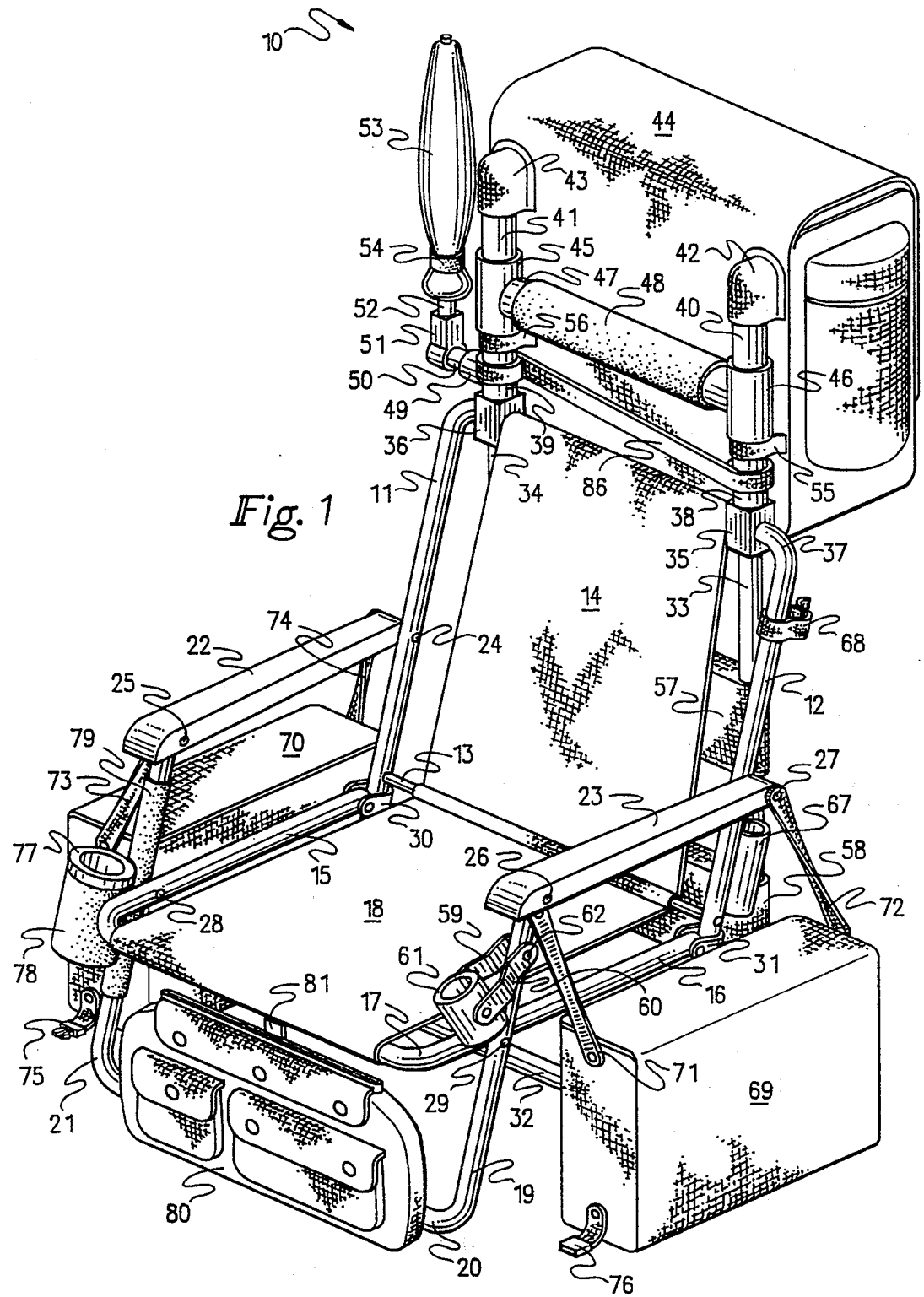
FIG. 1 is a perspective view of the combined chair and backpack according to the present invention, depicting the chair folded to an open position for use.

Referring now to the drawings, wherein like reference numerals designate corresponding-structure throughout the views, and referring in particular to FIGS. 1 through 7, an improved combined chair and backpack 10 according to a first preferred embodiment of the invention includes a folding chair frame having a chair back frame portion formed by spaced parallel tubular members 11 and 12 connected at opposite ends by transverse tubular members 32 and 37. Member 32 forms a horizontal ground engaging foot when the chair is in the erect orientation shown in FIG. 1. A transverse rod 13 divides the chair back frame and seat frame portions and partially supports and tensions a fabric covering including back portion 14 and seat portion 18. The chair seat frame portion includes spaced parallel tubular members 15 and 16 connected at front ends by a transverse tubular member 17 and pivotally secured at opposite ends to intermediate portions of members 11 and 12 by respective pivot brackets 30 and 31. Members 15 and 16 may optionally possess a telescopic extensible construction to allow the chair to be elongated into a chaise lounge or cot. A folding leg and arm rest support of the chair incudes spaced parallel tubular members 19 and 21 connected at distal ends by a transverse ground engaging leg or foot 20. The illustrated pivot pins or rivets 25, 26, 28, and 29 pivotally connect tubular leg members 19 and 21 to seat frame members 15 and 16 and also to forward ends of arm rests 22 and 23. Pivot pins 24 and 27 connect rearward ends of arm rests 22 and 23 to back frame members 11 and 12 such that the chair is selectively moveable between the erect orientation shown in FIG. 1 to the collapsed orientation shown in FIGS. 3, 5, and 7, in a manner analogous to that of a conventional folding lawn chair.

A pack frame includes spaced parallel members 33 and 34 connected in fixed rigid relation by transverse struts (not shown) concealed by transverse fabric webbing 57 and 58 adapted to conform to the contours of an individual's back during transportation. The upper transverse chair back frame member 37 extends for rotation through aligned apertures formed in pivot blocks 35 and 36 connected to upper ends of pack frame members 33 and 34, thus pivotally securing the chair back frame to the pack frame. As shown in FIG. 2, the pack frame may thus be selectively disposed in an inverted V-frame configuration with the chair back frame to enhance stability. This feature is not available in prior art combined chairs and backpacks which integrate the pack frame with the chair back frame or seat frame. A nylon strap 86 (FIG. 1) extends adjacent head rest 47 for the purpose of facilitating pack frame manipulation without disturbing the top pack frame assembly (to be described subsequently). To further facilitate manual manipulation of the combined chair and backpack 10, one or more simple loop type handles 85 secured by rivets 83 and 84 (FIG. 2) may be positioned along chair back frame members 11 and 12 to allow carrying in a collapsed condition in a horizontal orientation in the manner of a suitcase.

Cylindrical sleeves 38 and 39 are mounted for rotation on rods 63 and 64 extending upwardly from respective pivot blocks 36 and 35. Sleeve 39 includes a transverse aperture 62 which receives an umbrella mounting socket 49 in fixed press-fit relation. A conventional folding umbrella 53, secured in a closed condition by strap 54, includes a stem 52 connected to a support 51. A shaft 50 fixed to support 51 and mounted for rotation in socket 49 mounts the umbrella 53 for adjustment about a horizontal axis. Rotation of sleeve 39 about rod 63 mounts the umbrella 53 for independent adjustment about a vertical axis, such that the umbrella 53 may be adjusted for use while sitting in the chair or while carrying the pack. The rotational adjustment connections are preferably sufficiently close-fitting to maintain the umbrella 53 in a selected adjusted position by virtue of friction. As an additional or alternative retaining mechanism, a cooperating hook and loop pile fastening strap (VELCRO TM) (not shown) may be wrapped around the support 51 and adjacent pack frame.

A top frame portion of the backpack possesses a generally "H" shaped configuration formed by parallel tubular members 40 and 41 connected by a transverse cross member or head rest 47 and T-fittings 45 and 46. Head rest 47 is preferably slightly concavely contoured and includes a padding sleeve 48 for comfortably supporting the back of an individual's head while seated in the chair. A pack sack 44 is secured to the pack frame by releasable engagement of sewn pockets 42 and 43 and cooperating hook and loop pile fastening straps (VELCRO TM) 55 and 56 with frame members 40 and 41. The top pack frame is mounted for selected reversal. To effect this reversible mounting, rods 63 and 64 (FIG. 5) are selectively engageable in telescopic relation within top pack frame tubes 40 and 41. In the orientation shown in FIG. 1, the head rest 47 faces the erect chair, disposing the head rest for use by an individual seated in the chair. In a transportation mode, the top pack frame is reversed to the orientation shown in FIGS. 3 and 7 such that an individual may carry the pack frame and attached chair by use of shoulder strap harness 65, 66, with the head rest 47 useable by the carrying individual. It should be noted that the chair need not be necessarily collapsed for transportation. The chair may be carried in the erect orientation shown in FIG. 1 by merely reversing the top pack frame to orient the pack sack 44 over the chair. In this manner, bulky additional items may be supported and secured by cords, straps, etc., on the chair seat 18 for transportation.

The combined chair and backpack 10 includes two separate fishing rod holders. A first holder includes a short cylindrical tube 61 secured by pivot pin 62 to leg frame member 19 by a pair of spaced struts 59 and 60. As shown in FIG. 4, the handle of a fishing rod R is inserted within tube 61 until the butt of the rod abuts frame member 19, thus maintaining the rod in an operative orientation. For purposes of transportation and storage, a second holder includes a cylindrical tube 67 and a cooperating hook and loop pile fastening strap 68 fixed in spaced relation to back frame member 12 for holding a disassembled rod, as shown in FIGS. 2 and 3. The reel is preferably removed from the rod and stored in the pack sack 44 during transportation.

A plurality of straps 71, 72, 73, and 74 suspend a pair of insulated beverage and food storage bags from beneath arm rests 22 and 23 in the erect condition of the chair depicted in FIG. 1. For transportation, the chair frame is folded to the collapsed orientation shown in FIG. 7 and bags 69 and 70 are oriented in adjacent aligned relation as illustrated. Mating conventional quick release type strap fasteners 75 and 76 (FIG. 6) are then engaged to secure the bags 69 and 70 in the transportation mode shown in FIG. 7. One or more pairs of mating fasteners 75 and 76 may be disposed along the aligned edges of the bags 69 and 70 illustrated in FIG. 7.

Additional accessory features of the combined chair and backpack 10 include an insulated beverage can holder 77 provided with a circumferentially extending hook and loop pile fastener 78 engageable with a complimentary hook and loop pile fastener 79 surrounding leg frame tube 21. A fishing creel 80 is releasably suspended by mating quick release buckle fastening straps 81 and 82 (FIGS. 1 and 5) from front seat frame member 17. The creel 80 may thus be left secured for use by an individual fishing while seated in the chair, or removed for separate use. A variety of other alternative bags or pouches may be secured in place of creel 80.

In order to maintain the storage bags 69 and 70 in an erect rather than flattened configuration, the present invention contemplates the optional provision of stiffening inserts within each of the bags 69 and 70. With reference to FIGS. 7, 8, and 9, an example stiffening insert 90 is preferably formed from a ⅛ inch thick plastic sheet material having a plurality of longitudinal 93 and transverse 94 spaced support struts formed by generally rectangular cut outs divided by medial webs 96. Three corners of the resulting light weigh plastic sheet are bent to 90 degrees to form a rectangle dimensioned for insertion within the bags 69 and 70, with free end edge portions of the folded sheet in abutment at corner 98. The tensile memory forces of the plastic material cause the folded sheet to push outwardly against the side of the storage bag, thereby maintaining the erect rectangular shape to facilitate insertion and retrieval of the contents thereof. As a result of their thin lightweight construction, the stiffening inserts 90 do not significantly increase the weight of the device nor occupy a significant quantity of space within the storage bags.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A combined chair and backpack, comprising:
   a pack frame;
   a folding chair frame including a seat frame portion, pivotal arm rests, and a back frame portion, said seat frame portion pivotally connected to said back frame portion such that said chair frame may be selectively moved between an erect orientation and a collapsed orientation against said back frame portion; and
   means pivotally connecting said back frame portion to said pack frame for allowing said back frame portion to be selectively oriented in a first configuration forming an inverted V-frame with said pack frame or in a second configuration in which said back frame portion extends in closely adjacent substantially overlying relation with said pack frame.

2. The combined chair and backpack of claim 1, further comprising means releasably suspending a storage bag from a front portion of said seat frame portion.

3. The combined chair and backpack of claim 1, wherein said pack frame includes a strap harness such that said combined chair and backpack may be carried on an individual's back in both said erect and collapsed orientations.

4. The combined chair and backpack of claim 1, further comprising:
   at least one storage bag; and
   means suspending said storage bag from one of said arm rests.

5. The combined chair and backpack of claim 4, further comprising a stiffening member in said storage bag, said stiffening member comprising a thin plastic sheet deformed for insertion into said storage bag such that memory characteristics of said stiffening member urge it to a nondeformed condition and maintain said storage bag in an erect configuration.

6. The combined chair and backpack of claim 1, further comprising:
   a pair of storage bags; and
   means suspending said storage bags from respective ones of said arm rests such that said storage bags are selectively movable from an operative orientation disposed beneath said arm rests and a storage orientation against said seat frame portion.

7. The combined chair and backpack of claim 6, further comprising releasable fastening means for securing said storage bags to one another in said storage orientation.

8. The combined chair and backpack of claim 1, further comprising means removably securing a beverage holder to said chair frame.

9. The combined chair and backpack of claim 8, wherein said means removably securing said beverage holder comprising a first hook and loop type pile fastener on said beverage holder and a second cooperating hook and loop type pile fastener on said chair frame.

10. The combined chair and backpack of claim 1, further comprising means pivotally securing an umbrella to said pack frame for use in both erect and collapsed orientations of said chair.

11. The combined chair and backpack of claim 10, further comprising means mounting said umbrella to said pack frame for independent pivotal adjustment about two substantially perpendicular axes.

12. The combined chair and backpack of claim 1, further comprising a fishing rod holder secured to said chair frame.

13. The combined chair and backpack of claim 12, wherein said fishing rod holder includes a tubular member secured to said chair frame by at least one pivotal strut for holding an assembled rod during use.

14. The combined chair and backpack of claim 12, wherein said fishing rod holder includes a tubular member and a strap secured in spaced relation to said back frame portion for holding a disassembled rod for transportation.

15. The combined chair and backpack of claim 1, further comprising a top pack frame portion removably connected to said pack frame.

16. The combined chair and backpack of claim 15, wherein said top pack frame portion includes a head rest on one face and a storage sack on an opposite face.

17. The combined chair and backpack of claim 15, further comprising means mounting said top pack frame to said pack frame for selective reversal between a first orientation in which said head rest faces said chair frame for use by a person sitting in the chair, and a second orientation in which said head rest faces away from said chair frame for transportation.

18. The combined chair and backpack of claim 17, wherein said storage sack partially overlies said chair frame in a said second orientation of said top pack frame.

19. A combined chair and backpack, comprising:
a pack frame;
a chair frame;
means connecting said chair frame portion to said pack frame;
a top pack frame portion removably connected to said pack frame, said top pack frame portion including a head rest on one face and a storage sack on an opposite face; and means mounting said top pack frame to said pack frame for selective reversal between a first orientation in which said head rest faces said chair frame for use by a person sitting in the chair, and a second orientation in which said head rest faces away from said chair frame for transportation.

20. A combined chair and backpack, comprising:
a pack frame;
a chair frame including a back frame portion;
means pivotally connecting said back frame portion to said pack frame for allowing said back frame portion to be selectively oriented in a first configuration forming an inverted V-frame with said pack frame or in a second configuration in which said back frame portion extends in closely adjacent substantially overlying relation with said pack frame;
a top pack frame portion removably connected to said pack frame, said top pack frame portion including a head rest on one face and a storage sack on an opposite face; and
means mounting said top pack frame to said pack frame for selective reversal between a first orientation in which said head rest faces said chair frame for use by a person sitting in the chair, and a second orientation in which said head rest faces away from said chair frame for transportation.

* * * * *